United States Patent
Kazerani et al.

(10) Patent No.: US 10,666,799 B2
(45) Date of Patent: May 26, 2020

(54) VIRTUAL OFFICE RECEPTIONIST

(71) Applicant: OpenPath Security Inc., Marina Del Rey, CA (US)

(72) Inventors: Alexander A. Kazerani, Santa Monica, CA (US); Robert J. Peters, Culver City, CA (US); Amir Reza Khakpour, Santa Monica, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 76 days.

(21) Appl. No.: 15/628,446

(22) Filed: Jun. 20, 2017

(65) Prior Publication Data

US 2018/0367670 A1 Dec. 20, 2018

(51) Int. Cl.
*H04M 3/42* (2006.01)
*H04M 3/493* (2006.01)
(Continued)

(52) U.S. Cl.
CPC .......... *H04M 3/4936* (2013.01); *G06N 5/046* (2013.01); *G06N 20/00* (2019.01); *G06Q 10/06* (2013.01); *G06Q 10/06314* (2013.01); *G07C 9/257* (2020.01); *H04M 3/42059* (2013.01); *H04M 3/436* (2013.01); *H04M 3/527* (2013.01);
(Continued)

(58) Field of Classification Search
CPC ........ H04M 3/46; H04M 3/4211; H04M 3/54; H04M 3/42102; H04M 3/42348; H04M 2242/30; H04M 3/42263; H04M 3/565; H04M 3/42365; H04L 67/42; H04L 61/605; H04L 67/22; H04L 67/306; H04L 51/046; H04L 67/04; H04L 29/06176; H04L 51/04; H04L 65/1063; H04L 65/4007; H04L 67/10; H04L 67/24; G06Q 30/0256; G06Q 30/0261; G06Q 30/0257; G06F 19/00; G06F 3/0482; G06F 3/04842; G06F 3/167; G06F 17/3043; G06F 17/30684; G06F 17/30864; G06F 3/0488; G06F 2203/0381;
(Continued)

(56) References Cited

U.S. PATENT DOCUMENTS 7,801,284 B1 * 9/2010 Chakra ........... H04M 1/274525
                                                        379/88.03
8,346,563 B1 * 1/2013 Hjelm ................. G10L 15/1822
                                                        379/88.01
(Continued)

*Primary Examiner* — Ahmad F. Matar
*Assistant Examiner* — Kharye Pope
(74) *Attorney, Agent, or Firm* — Ansari Katiraei LLP; Arman Katiraei; Sadiq Ansari

(57) ABSTRACT

Provided is an office receptionist system formed from a distributed set of system valets and a system concierge. The system valets record and pass human inquiries at various points of ingress and egress to the system concierge. The system concierge parses each inquiry, determines the type of inquiry being made, and further determines whether the inquiry provides sufficient information for the determined inquiry type. The sufficiency of the inquiry is determined from a rule set that further defines different data sources from which the system concierge obtains data elements for generating a response to the inquiry as well as the actions to perform as part of responding to the inquiry. The response is returned to the system valet originating the inquiry for playback thereon.

16 Claims, 9 Drawing Sheets

(51) Int. Cl.
*G06Q 10/06* (2012.01)
*H04M 3/436* (2006.01)
*H04M 3/527* (2006.01)
*G06N 20/20* (2019.01)
*G06N 5/04* (2006.01)
*G07C 9/25* (2020.01)
*H04M 3/533* (2006.01)
*G07C 9/37* (2020.01)
*G06N 20/00* (2019.01)
*H04N 5/30* (2006.01)
*G06Q 30/00* (2012.01)
*H04M 11/00* (2006.01)

(52) U.S. Cl.
CPC ... *G06Q 10/0631* (2013.01); *G06Q 10/06311* (2013.01); *G07C 9/37* (2020.01); *H04M 3/42* (2013.01); *H04M 3/533* (2013.01); *H04M 3/53383* (2013.01); *H04M 2201/40* (2013.01); *H04M 2201/405* (2013.01); *H04M 2203/2027* (2013.01)

(58) Field of Classification Search
CPC ............... G06F 3/048; G06F 17/30967; G06F 17/2775; G06F 17/30442; G06F 8/34
USPC ....... 379/218.01, 88.01, 93.01, 88.13, 88.17, 379/93.23; 370/352, 353, 356
See application file for complete search history.

(56) References Cited

U.S. PATENT DOCUMENTS

| | | | | |
|---|---|---|---|---|
| 10,185,921 B1* | 1/2019 | Heller | | G06Q 10/02 |
| 2002/0160766 A1* | 10/2002 | Portman | | G06F 17/3043 |
| | | | | 455/422.1 |
| 2003/0002645 A1* | 1/2003 | Worsham | | H04M 3/42229 |
| | | | | 379/211.03 |
| 2003/0095184 A1* | 5/2003 | Lin | | H04N 7/185 |
| | | | | 348/156 |
| 2003/0167176 A1* | 9/2003 | Knudson | | G06Q 10/10 |
| | | | | 709/204 |
| 2004/0249662 A1* | 12/2004 | Mallick | | G06Q 10/0637 |
| | | | | 705/7.36 |
| 2007/0103541 A1* | 5/2007 | Carter | | H04N 7/142 |
| | | | | 348/14.06 |
| 2007/0167136 A1* | 7/2007 | Groth | | G06Q 10/109 |
| | | | | 455/41.2 |
| 2008/0130956 A1* | 6/2008 | Jordan | | G07C 9/00031 |
| | | | | 382/115 |
| 2008/0251579 A1* | 10/2008 | Larsen | | G06Q 10/10 |
| | | | | 235/380 |
| 2009/0281825 A1* | 11/2009 | Larsen | | G06Q 10/10 |
| | | | | 705/2 |
| 2011/0137548 A1* | 6/2011 | Shen | | G06F 1/1694 |
| | | | | 701/533 |
| 2011/0173549 A1* | 7/2011 | Hipskind | | G06Q 20/1085 |
| | | | | 715/756 |
| 2012/0136852 A1* | 5/2012 | Geller | | G06Q 30/02 |
| | | | | 707/722 |
| 2012/0280784 A1* | 11/2012 | Gaviria Velez | | H04M 1/72522 |
| | | | | 340/5.7 |
| 2013/0300867 A1* | 11/2013 | Yoder | | H04N 7/18 |
| | | | | 348/143 |
| 2016/0027138 A1* | 1/2016 | Larsen | | G06Q 10/10 |
| | | | | 705/2 |
| 2016/0142536 A1* | 5/2016 | Bendi | | H04M 3/4288 |
| | | | | 455/411 |
| 2016/0261648 A1* | 9/2016 | Ruetschi | | G06F 17/275 |
| 2016/0284140 A1* | 9/2016 | Klein | | G06F 16/951 |
| 2017/0004116 A1* | 1/2017 | Mital | | G06F 17/212 |
| 2017/0293610 A1* | 10/2017 | Tran | | G06F 16/90332 |
| 2017/0329654 A1* | 11/2017 | Liensberger | | G06N 20/00 |
| 2018/0137856 A1* | 5/2018 | Gilbert | | G10L 15/22 |

* cited by examiner

VIRTUAL OFFICE RECEPTIONIST

BACKGROUND ART

Receptionists are the initial point of contact between a company and external parties. Receptionists greet visitors, facilitate meetings between visitors and office personnel, accept deliveries, direct traffic, provide answers to some questions, and locate appropriate personnel to answer other questions.

Receptionists, however, cannot be everywhere at all times. A business can have multiple points of ingress and egress, operate from multiple suites, or operate from multiple buildings on a campus. Having a receptionist at each such location is impractical while funneling all traffic to a receptionist at a particular location is inconvenient and inefficient.

Intercoms and cameras extend the reach of a receptionist, but cannot extend the ability of the receptionist to assist more than one person at a time. Thus, if the receptionist is answering telephone inquiries, occupied by one visitor at their desk, or not at their desk, other visitors will be made to wait regardless of whether they are at the front desk, on the telephone, or communicating through an intercom or camera.

Human receptionists also cannot be all-knowing. Human receptionists may not know all visitors and deliveries coming to a business in a given day, let alone, over the course of a week or more. Similarly, human receptionists may not know every individual of a business, let alone, where those individuals are or what those individuals are doing when a visitor comes looking for them. This lack of knowledge hinders how quickly and how accurately the human receptionist can perform the multitude of receptionist functions.

The presence and knowledge shortcomings of human receptionists grow as does the company. Company growth goes hand-in-hand with more office space, more office personnel, more visitors, more deliveries, and more inquires implicating more company inter-dependencies. The growth demands more receptionists with greater knowledge of the company and its inner-workings. To offset such demand, there is a need for a receptionist that is all-knowing of a business and everywhere within a business at all times. In other words, there is a need for a digital or virtual office receptionist that can assume the functions of several human receptionists with the same simple human-to-human interactivity.

BRIEF DESCRIPTION OF THE DRAWINGS

A preferred embodiment for a virtual office receptionist will now be described, by way of example only, with reference to the accompanying drawings in which.

DETAILED DESCRIPTION

The disclosure is directed to an office receptionist system in which a virtual or electronic office receptionist performs duties of one or more human receptionists. The virtual office receptionist intelligently and accurately responds to user inquiries at different points of ingress and egress of a business based on real-time connected access to different office personnel and office information. Such connectivity enables the virtual office receptionist to be "all-knowing" and "ever-present" throughout the office or business. More specifically, the connectivity empowers the virtual office receptionist to respond to human inquiries with greater specificity, accuracy, and timeliness than is possible with multiple human receptionists.

Figure 1:
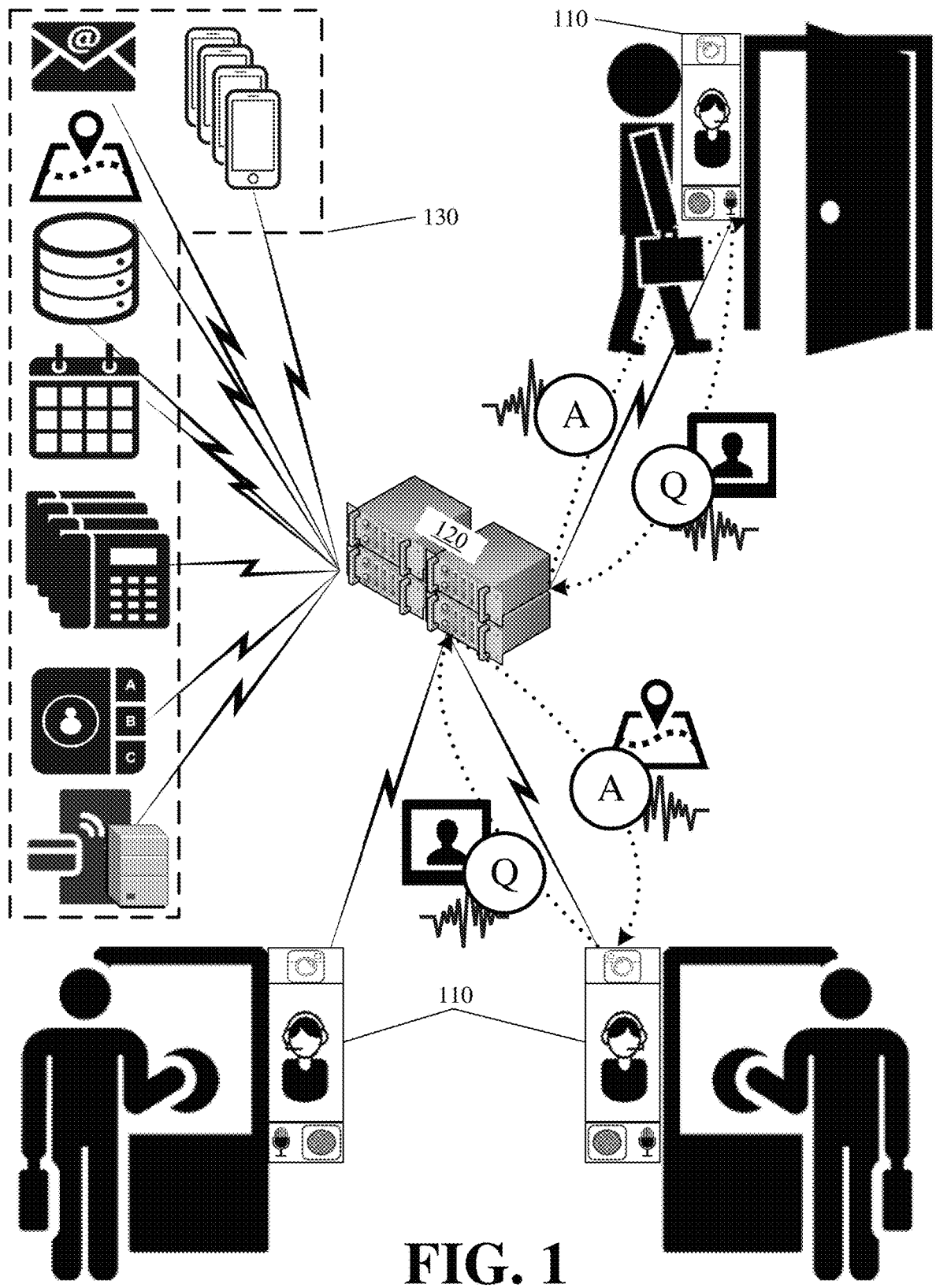
FIG. 1 conceptually illustrates the virtual office receptionist system architecture in accordance with some embodiments.

FIG. 1 conceptually illustrates the virtual office receptionist system architecture in accordance with some embodiments. The system architecture is primarily formed from a distributed set of system valets 110 and a system concierge 120.

Each system valet 110 is positioned about a different point of ingress or egress of a business or building. System valets 110 can also be desktop devices or devices placed near an office or cubicle where receptionist or similar secretarial functionality is desired. In embodiments involving interactions between office personnel and the virtual office receptionist interactions, the system valets 110 can also be placed on office personnel mobile devices.

Each system valet 110 greets humans as they arrive. The humans speak their inquiry to the system valet 110. The audio in conjunction with any images or video obtained by the system valet 110 pass to the system concierge 120 over a digital network for processing, a response, and execution of one or more actions. The response is output as audio with optional imagery to the human. The system valet 110 can engage in multiple such exchanges with a human to fully address that human's inquiry with the exchanges obtaining additional information related to the inquiry from the human or answering inquiries with greater specificity or inquiries that arise from a provided response.

The system concierge 120 provides back-end services through one or more machines. In some embodiments, the system concierge 120 is deployed in the same building or campus as the system valets 110. This allows company personnel to directly administer and control the system concierge 120. In some other embodiments, the system concierge 120 is provisioned offsite. In some such embodiments, the system concierge 120 is hosted in the cloud. Administration can be left to a third-party service provider, although company personnel can still access the system concierge in the cloud for remote administration 120. In either deployment, the system concierge 120 has network connectivity to the distributed set of system valets 110 as well as one or more data sources 130.

The data sources 130 are connected systems and devices with digitally accessible information from which the system concierge 120 builds accurate and intelligent responses to human inquiries. In other words, the system concierge 120 creates responses to each human inquiry that are customized with informational elements sourced from the different data sources 130 that are relevant to the inquiry. The data sources 130 also include control systems within the office building from which the system concierge 120 can obtain various state or information about office personnel. The system concierge 120 also execute actions against the data sources including the control systems with the execution modifying information within the data sources or company resources under control of the data source control systems.

The data sources 130 are configured to permit queries and access by the system concierge 120. Such access to the data sources 130 may be granted by configuring privileged access credentials for the system concierge 120. In some embodiments, the system concierge 120 queries the data sources 130 or issues commands for execution thereon through application programming interfaces (APIs) or programmatic or network accessible interfaces to the data sources 130.

The data sources 130 are primarily comprised of existing systems and devices of the company. In some embodiments, the data sources 130 include devices of office personnel (e.g., mobile smartphones, laptops, desktop computers, portable digital assistances, smart devices, Internet-of-Things devices associated with office personnel), telecommunications systems, directories, email systems, calendaring systems, and access control systems.

The office personnel devices provide real-time information as to the location of humans. Location can be determined from Global Positioning System (GPS) geocoordinates, connections to different wireless networks, periodic wireless beaconing, or other means. The telecommunications systems can include intercoms and desktop telephones that can be used to contact or message office personnel. The directories are data repositories storing data about office personnel including one or more of office personnel names, contact information (e.g., email addresses, mobile telephone numbers, desktop telephone numbers, instant message handles, etc.), office personnel images, roles, and office locations as some examples. The email and calendaring systems are systems for sending and receiving electronic communications, scheduling meetings, and storing contacts. The access control systems are used to control access to various resources in the building. In particular, access control systems lock and unlock doors within the building. Such control systems serve as data sources 130 because they can provide to the system concierge 120 relevant information as to which employees have entered a building and which ones have left the building. Access control systems can also control climate, lighting, and other connected devices and resources of the company.

The enumerated data sources above are not meant to be an exhaustive listing of data sources 130 that the system concierge 120 can access and leverage in generating responses to inquiries. Any network accessible system, including data sources external to the company, can be accessed by the system concierge 120. Moreover, the system concierge 120 can be configured to retrieve structured data of any kind from the accessible systems.

Figure 2:
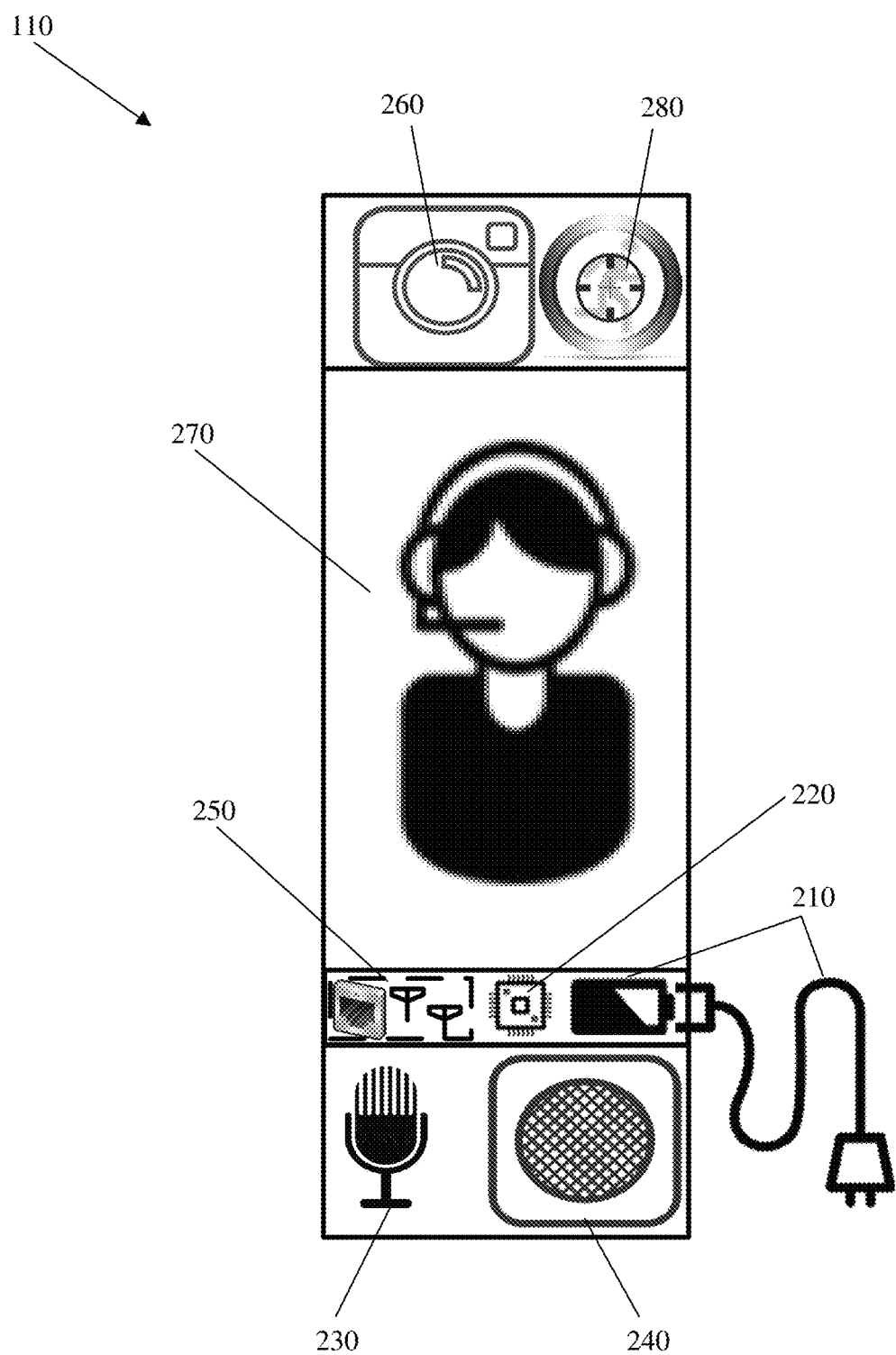
FIG. 2 conceptually illustrates hardware components of the system valet in accordance with some embodiments.

The utility and operation of the virtual office receptionist is described by reference to the hardware components of the system valets 110 and system concierge 120. FIG. 2 conceptually illustrates hardware components of the system valet 110 in accordance with some embodiments. Some of the illustrated hardware components may be optional as the hardware can vary depending on the level of complexity and cost desired for the system valet 110.

Hardware components for a basic embodiment of the system valet 110 includes a power source 210, a processor 220, a microphone 230, a speaker 240, and network connectivity 250. This basic embodiment has a single sensor (i.e., the microphone 230) for capturing human input. Complexity and interactivity of the system valet 110 improves by introducing additional sensors to operate in conjunction with the microphone 230. Some embodiments of the system valet 110 include one or more other sensors such as a camera 260, touchscreen 270, motion sensor 280, light sensor (not shown), or heat sensor (not shown) as some examples.

The power source 210 provides the power needed to operate the components of the system valet 110. A wired power source is preferred, although some embodiments of the system valet 110 can be powered with an on-board battery or rely on an on-board battery for a backup power supply.

The processor 220 leverages at least the microphone 230 and speaker 240 to engage and interact with humans in the same manner as would a human receptionist. In other words, there is no learning curve or adaptation that users make when interacting with the virtual office receptionist of some embodiments or human receptionists. The processor 220 leverages the network connectivity 250 to pass human inquiries and answers to the system concierge 120 and to receive responses and follow-up questions for humans from the system concierge 120.

The microphone 230 records user inquiries as audio prompts. The audio prompts can be digital files that encode snippets or segments of audio from humans. The processor 220 can leverage the microphone 230 to detect the start and end of an audio prompt. Some adjustable amount of silent buffer may be used to permit time for human thought, pause, or other action and prevent premature ending of an inquiry. In some embodiments, the microphone 230 is also used to detect the presence or approach of a human and trigger a greeting.

The greeting, system concierge 120 created responses, and follow-up questions are provided as audible prompts that are output through the speaker 240. In some embodiments, the system valet 110 includes a single speaker 240. In some other embodiments, the system valet 110 includes a speaker array with a signal processor, wherein the speaker array is formed from two or more speakers that are offset from one another by some angle, orientation, or other placement. The signal processor directs audio in different directions by using different speakers of the speaker array. Such functionality enhances interactivity of the system valet 110 when communicating with different individuals in the same area (e.g., waiting room or receptionist area). For example, the system valet 110 may have greeted two different visitors who then sit and wait for office personnel to receive them. In this instance, the system valet 110 can direct the speaker array in outputting an audio prompt to the tracked or monitored position of the first visitor when providing a response to that first visitor, and direct the speaker array in outputting an audio prompt to the tracked or monitored position of the second visitor when providing a response to that second visitor.

The system valet 110 communicably couples to the system concierge 120 using the network connectivity 250. The network connectivity 250 between the system valets 110 and the system concierge 120 can be wired or wireless. Wired connectivity involves a network interface controller and a network interface port, such as an ethernet controller and port. Wireless connectivity involves having one or more of WiFi, Long Term Evolution (LTE), or other wireless networking receiver and transceiver on the system valets 110.

The system valet 110 can also use the network connectivity 250 to communicably couple with mobile devices carried by humans coming before the system valet 110. In some such embodiments, the system valet 110 uses Bluetooth, Bluetooth Low Energy, Near Field Communications, or other short-range wireless connectivity to detect and connect with the mobile devices. WiFi and other wireless networking can also be used to connect with the mobile devices. This system valet-to-mobile device connection can be used to supplement the information the system valet 110 provides to the system concierge 120. In some embodiments, the information obtained from a mobile device communicably coupled to a system valet 110 assists in identifying the human before the system valet 110 or access permissions granted to that human without the human having to take any action or speak any words. In other words, as the human approaches the system valet 110, the system valet processor 220 through the wireless network connectivity 250 detects presence of a mobile device carried by the human, handshakes a secure connection to the mobile device, and then obtains information from the mobile device based on a sequence of exchanged messages. In some embodiments, the system valet-to-mobile device connection can also be used as another means with which to submit the inquiry to the virtual office receptionist system. Text messages, emails, instant messages, and other digital messaging or packets can be used to transmit an inquiry from a mobile device to a system valet or directly to the system concierge. In some embodiments, the system valet 110 awakes or triggers a greeting in response to the system valet 110 detecting, via the network connectivity 250, a wireless signal from the mobile device carried by the human.

The system valet 110 can further use the network connectivity to connect to electronic control systems, such as access control systems that control the locking and unlocking of doors and other electronically controlled company resources. The system valet 110 can incorporate access control reader functionality with the network connectivity. The access control reader functionality enables the system valet 110 to receive access requests or access credentials from key cards or mobile devices of humans, and perform an unlocking or locking action based on the received access requests or credentials. In some embodiments, the authorization of the access requests or credentials is performed by the system concierge 120 or other access control system that is forwarded the access requests or credentials from the system valet 110.

The system valet camera 260 captures images or video of the humans speaking the inquiries to the system valet 110. The images or video can be sent with the audio prompt to the system concierge 120. This visual input is used by the system concierge 120 to better identify the human before the system valet 110, which in turn, allows the system concierge 120 to better customize the responses or follow-up questions it forms to the human inquiries. The camera 260 can also be used to trigger the greeting in response to detecting a human coming before the system valet 110.

The touchscreen 270 enhances the interactivity of the virtual office receptionist. The touchscreen 270 visually presents the greeting and other information to the individuals before the system valet 110. For example, the touchscreen 270 presents a map of the office floorplan along with guidance directions in directing a visitor to a conference room or other location. The touchscreen 270 can also be interacted with using touch in order to obtain further input from the human, such as a digital signature or selection.

The system valet 110 can also leverage the camera 260 to customize a computer-generated receptionist presented on the touchscreen 270 when interacting with individuals before the system valet 110. The interactivity of the computer-generated receptionist is enhanced by tracking movements or positioning of the human with the camera 260. In particular, the computer-generated receptionist can be rendered according to the tracked movements or positioning so that the computer-generated receptionist appears to be making eye contact with the human being interacted with. Thus, if there are multiple individuals waiting for office personnel to receive them, the computer-generated receptionist can focus on a particular individual to let them know when the requested office personnel are on their way.

As noted above, the system valet 110 can also have one or more of a motion sensor 280, light sensor, heat sensor, or other sensor. These sensors identify approaching individuals and trigger the system valet greeting.

The system concierge 120 is also a networked device with at least one processor, memory, and storage. As noted above with reference to FIG. 1, the system concierge 120 is communicably coupled to the distributed set of system valets 110, and also to one or more data sources 130 including mobile devices, telecommunications systems, employee directories, email systems, calendaring systems, and access control systems as some examples.

The system concierge processor has an audio processing unit. The audio processing unit converts the audio prompts received from the system valets 110 into parsed data structures with machine readable data. The data structures are formatted with data fields for identifying one or more requestors, one or more requested office personnel, one or more actions (e.g., meeting, delivery, message, unlock or lock a door, etc.), questions associated with the query, times, and implicated resources if specified as part of the audio prompt.

The parsing can be performed locally by the audio processing unit or remotely in conjunction with a speech conversion service provider. Accuracy of the conversion is important as the prompts will commonly include names of the speaker or office personnel requested by the speaker. In many cases, human names do not have dictionary entries or are unique and are therefore difficult to decipher without additional reference points. The system concierge 120 communicably couples to one or more of the data sources 130 to assist in the conversion of such audio and name detection.

Figure 3:
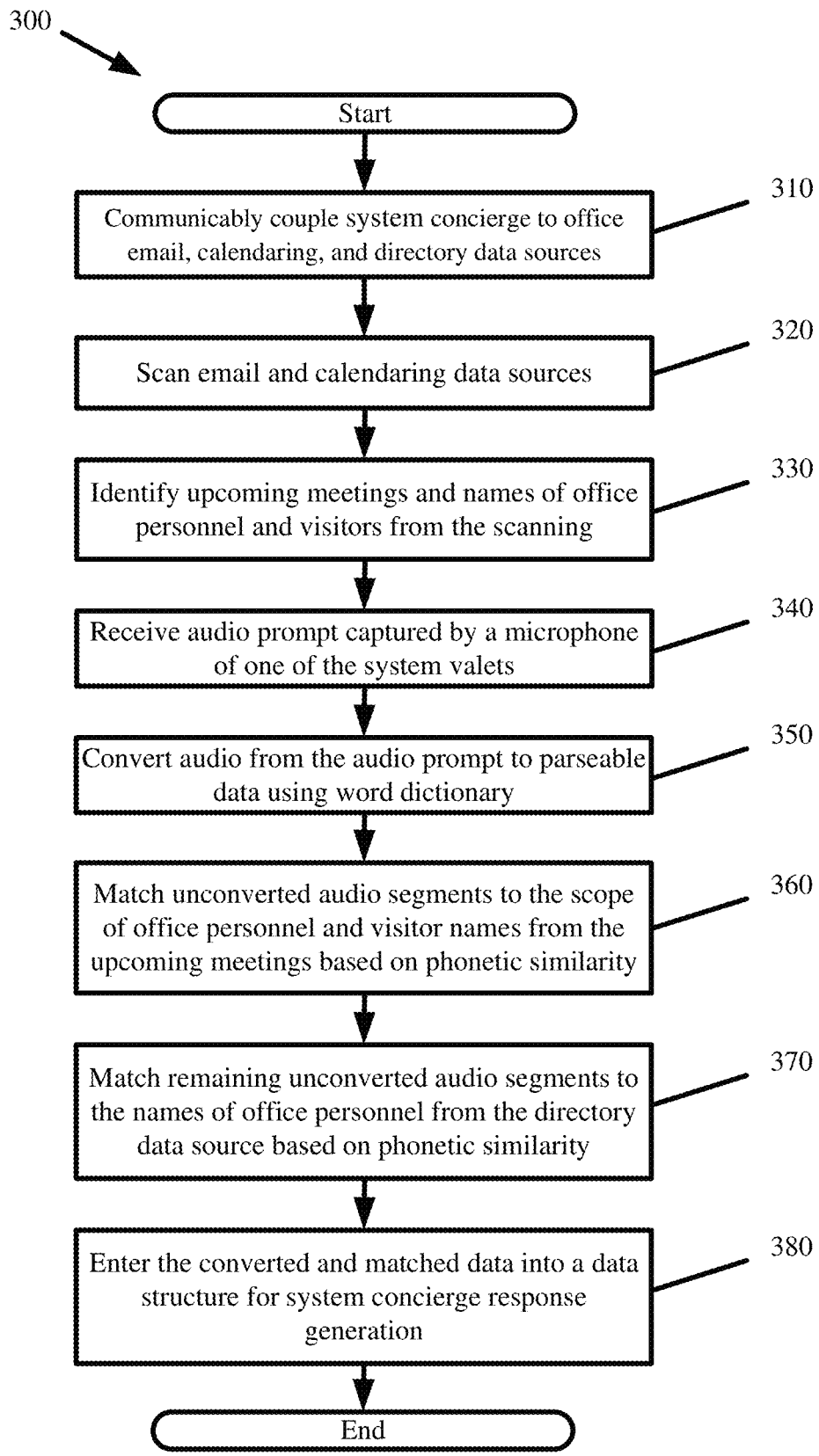
FIG. 3 presents a process for enhanced human identification from spoken audio in accordance with some embodiments.

FIG. 3 presents a process 300 for enhanced human identification from spoken audio in accordance with some embodiments. Process 300 is performed by the system concierge, and more specifically, by the audio processing input of the system concierge having access to information from the communicably coupled data sources.

The process involves communicably coupling (at 310) to one or more of office email, calendar, and directory data sources. The process scans (at 320) the email and calendaring systems and identifies (at 330) upcoming meetings and names of office personnel and visitors from the scanning.

The process continues in response to the system concierge receiving (at 340) an audio prompt captured by a microphone of one of the system valets within the virtual office receptionist system, wherein the audio prompt comprises sounds spoken by a human that are captured and digitized using the system valet microphone. The process, by operation of the system concierge audio processing unit, converts (at 350) the audio to parsed data. For audio segments for which there is no phonetic match in a word dictionary, the process matches (at 360) those audio segments to the scope of office personnel and visitor names from the meeting information extracted from the email and calendaring systems having phonetic similarity. For the remaining subset of audio segments that still cannot be matched, the process matches (at 370) the remaining subset of audio segments to the names of office personnel from the employee directory having phonetic similarity. The process enters (at 380) the converted and matched data into a data structure for subsequent processing and response generation according to the rule sets described below with reference to FIG. 5.

The system concierge audio processing unit also performs an inverse data-to-audio conversion operation to produce the audio for the responses generated by the system concierge. This audio passes from the system concierge to a corresponding system valet for playback through the system valet speaker. In some embodiments, it is more efficient to perform the data-to-audio conversion at the system valets. In some such embodiments, the system valets are modified to include an audio processing unit for receiving data for a response generated by the system concierge and for converting the received data to audio that is played back from the system valet speaker.

In embodiments in which the system valets include a camera, the system concierge processor has an image processing unit. The image processing unit receives images or video from the distributed set of system valets. The image processing unit processes the images in order to identify humans appearing therein. The information about the visually identified humans populate some of the same data fields from the data structures created by the audio processing unit. The information extracted by the image processing unit can be used as a substitute or supplement to information extracted by the audio processing unit. For instance, even when the spoken inquiry does not include the name of the inquiring individual, the system concierge can still identify the individual through the captured image and determine if that individual has an appointment to meet with specific office personnel. The system concierge can leverage access to the communicably coupled office email and calendaring systems, employee directory, access control system, and external data sources to assist in the identification of humans from captured images.

Figure 4:
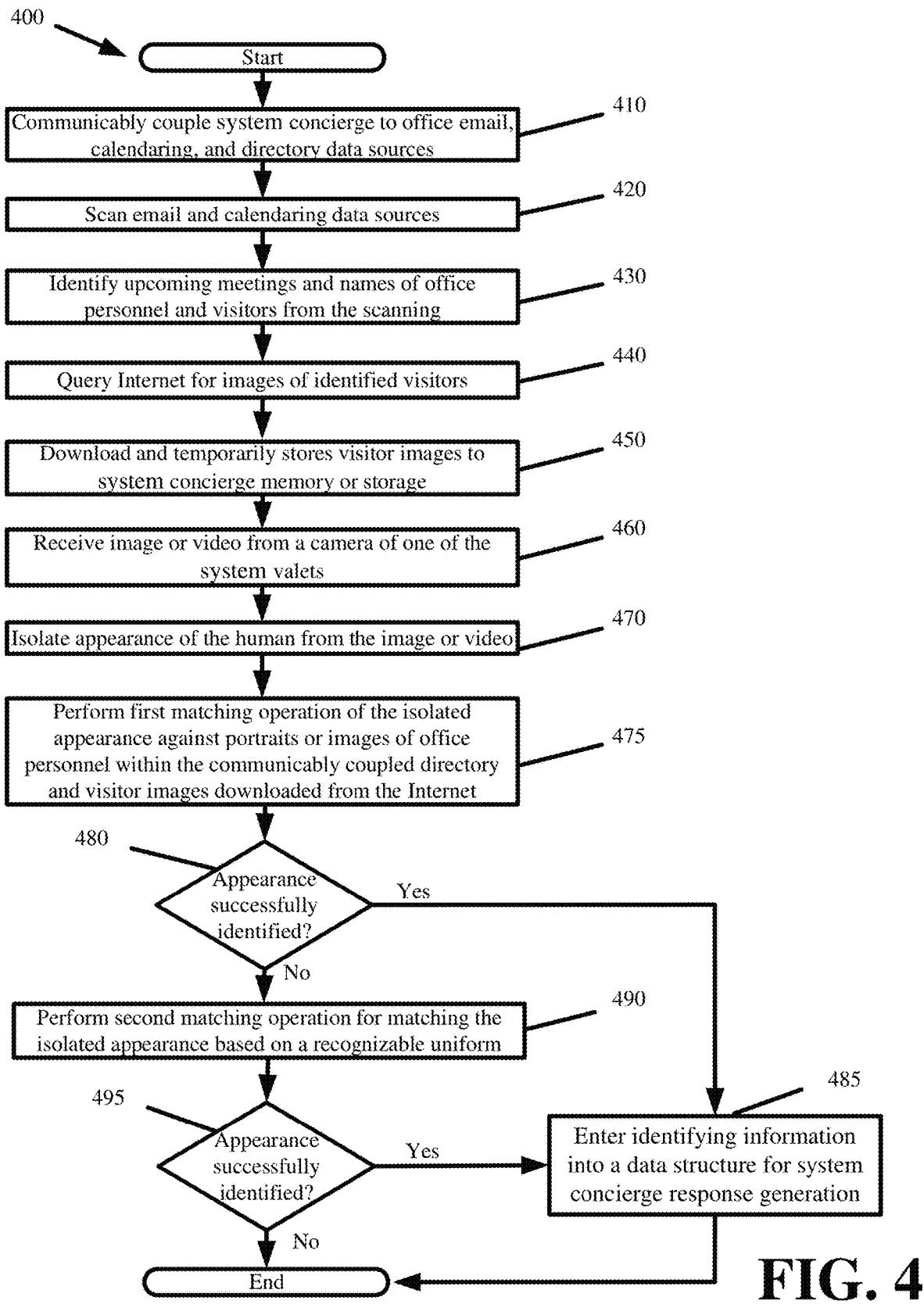
FIG. 4 presents a process for enhanced human identification from visual images in accordance with some embodiments.

FIG. 4 presents a process 400 for enhanced human identification from visual images in accordance with some embodiments. Process 400 is performed by the system concierge, and more specifically, by the image processing unit of the system concierge having access to information from the communicably coupled data sources.

As with process 300, process 400 involves communicably coupling (at 410) to office email and calendaring systems as well as the employee directory. The process scans (at 420) the email and calendaring systems and identifies (at 430) upcoming meetings and identifying information for visitors from the scanning. The identifying information can be a name, email address, telephone address, or other contact information. The process queries (at 440) the Internet, including specific websites like LinkedIn® and Facebook®, for images of the identified visitors. The office email systems may also contain the queried for images. The process downloads (at 450) and temporarily stores the images to system concierge memory or storage.

The process continues in response to the system concierge receiving (at 460) an image or video from a camera of one of the system valets within the virtual office receptionist system, wherein the image or video captures an appearance of a human before the system valet. The process by operation of the system concierge image processing unit, isolates (at 470) the appearance of the human from the image or video.

The process performs (at 475) a first matching operation of the isolated appearance against portraits or images of office personnel within the communicably coupled employee directory and those of expected visitors downloaded from the Internet, wherein the employee directory is a data source storing names, roles, contact information, and images of employees or office personnel. In response to the first matching operation successfully identifying (at 480) the human before the system valet, the process enters (at 485) any identifying information (i.e., name, role, contact information, etc.) to the data structure used for generating the system concierge responses.

The first matching operation can fail if the individual captured in the image is an unexpected visitor or a match cannot be made against any of the reference images from the employee directory or those downloaded from the Internet. In such cases, the process performs (at 490) a second matching operation for matching the isolated appearance based on a recognizable uniform. Delivery personnel, such as workers of the United States Postal Service or the United Parcel Service, have distinct uniforms from which the general identity can be identified. The second matching operation does not yield an exact name, but the resulting identification of the general identity is sufficient for determining how to respond to deliveries, drop-offs, or other inquiries from such visitors. In response to the second matching operation successfully identifying (at 495) the human before the system valet, the process enters (at 485) any identifying information to the data structure for subsequent processing and response generation according to the rule sets described below with reference to FIG. 5. Otherwise, the visual identification fails and the process ends, or other image matching operations are performed.

The system concierge memory or storage stores at least one rule set from which responses to system valet captured inquiries are generated. The at least one rule set defines the different inquiries that the system concierge can respond to as well as the complexity of each response. The complexity of a response is based in part on the amount of information that the system concierge stitches together from the different accessible and communicably coupled data sources.

In some embodiments, the rule set is defined hierarchically with an inquiry type, a first inquiry data set, a second response data set, and actions tier. Each of these tiers can have branches of different vertical lengths and horizontal lengths. For example, the first inquiry data set for a particular inquiry type adds one vertical tier to the rule set, but multiple horizontal branches in that vertical tier. In some embodiments, the rule set is specified as a tiered set of conditional statements, similar to "If This Then That" statements. This makes adding to, removing from, and modifying the rule set easy and efficient. The various tiers and branches of the rule set are traversed according to the data within the data structures parsed from the system valet input, and also according to the data the system concierge obtains from the different data sources.

Figure 5:
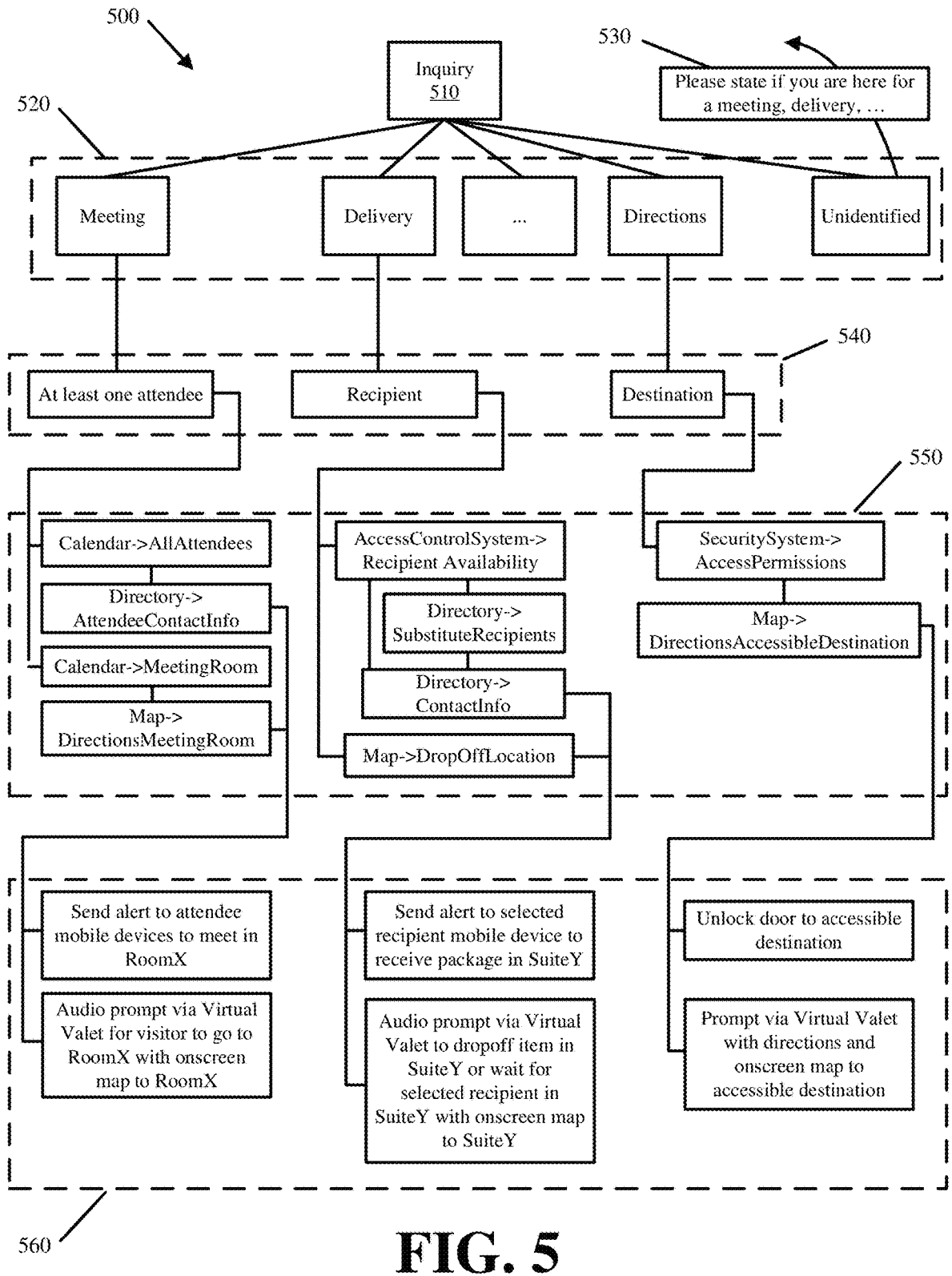
FIG. 5 presents an exemplary rule set in accordance with some embodiments.

FIG. 5 presents an exemplary rule set 500 in accordance with some embodiments. The rule set 500 is traversed based on a received human inquiry 510. More specifically, the rule set 500 is traversed based on the populated data fields of the data structure produced from processing the human submitted inquiry, wherein the human submitted inquiry includes the audio prompt and supplemental data such as a captured image or data acquired from message exchanges with the mobile device of the human submitting the audio prompt.

The first step in the rule set 500 traversal is to identify the inquiry type 520. As the virtual office receptionist assumes the role of a human receptionist, there are well-defined types of inquiries that human receptionists commonly encounter. Some examples of inquiry types 520 include meeting requests, deliveries, message forwarding, directions, and resource access (e.g., to a door, conference room, supplies, etc.).

If the inquiry type 520 cannot be determined from the data fields of the inquiry generated data structure, the system concierge can submit a response 530 asking for additional information from the human before the system valet from which the inquiry originates. The response 530 directs the human's answer to one of the defined inquiry types 520 in the rule set. If the human's answer still falls outside the defined inquiry types 520, the rule set 500 can default to requesting human assistance from designated office personnel. In such cases, the system concierge may bridge the communication link between the system valet and the designated office personnel so that the office personnel can communicate directly with the visitor without restriction.

For each inquiry type 520, the rule set 500 defines a first inquiry data set 540. The first inquiry data set 540 specifies the details of the inquiry 510. Stated differently, the first inquiry data set 540 defines the data elements from which the system concierge understands the inquiry 510. The details can include one or more of the subject, time, place, person, or object of the inquiry 510 as some examples. The first inquiry data set 540 is built from the data fields of the inquiry generated data structure, thereby including data from audio processing of the audio prompt as well as any image processing conducted on images captured by the system valet.

If the parsed or processed data provided as part of the initial inquiry 510 does not contain all the data elements specified for the first inquiry data set 540 of the identified inquiry type 520, the system concierge response involves asking the human one or more questions through the system valet to obtain the missing data elements. The system concierge may engage in multiple question iterations with the human to build the first inquiry data set 540. It should be noted that the data structure obtained from the inquiry 510 may include data elements or data fields in addition to those specified by the first inquiry data set 540 for the identified inquiry type 520, because the parsed audio prompt provided more than the baseline set of data needed for the identified inquiry type 520.

The rule set 500 further defines a second response data set 550 under each first inquiry data set 540 of each inquiry type 520. The second response data set 550 defines the data elements with which the system concierge responds to the inquiry 510. The system concierge builds the second response data set 550 from the communicably coupled data sources. Each data element from the second response data set 550 specifies one or more of the data sources the system concierge is to query and the information to extract from the queried data source(s). The querying can be keyed to data elements from the first inquiry data set 540.

The rule set then defines one or more actions 560 for the system concierge to perform based on the second response data set 550. Generally, the actions 560 include contacting, alerting, or otherwise communicating with office personnel implicated by the human submitting the inquiry, communicating with the human submitting the inquiry though the system valet, modifying or controlling office resources (e.g., unlocking doors, reserving conference rooms, providing access to office equipment, etc.), and modifying one or more of the data sources (e.g., scheduling or modifying a meeting in the calendaring system) as some examples.

Figure 6:
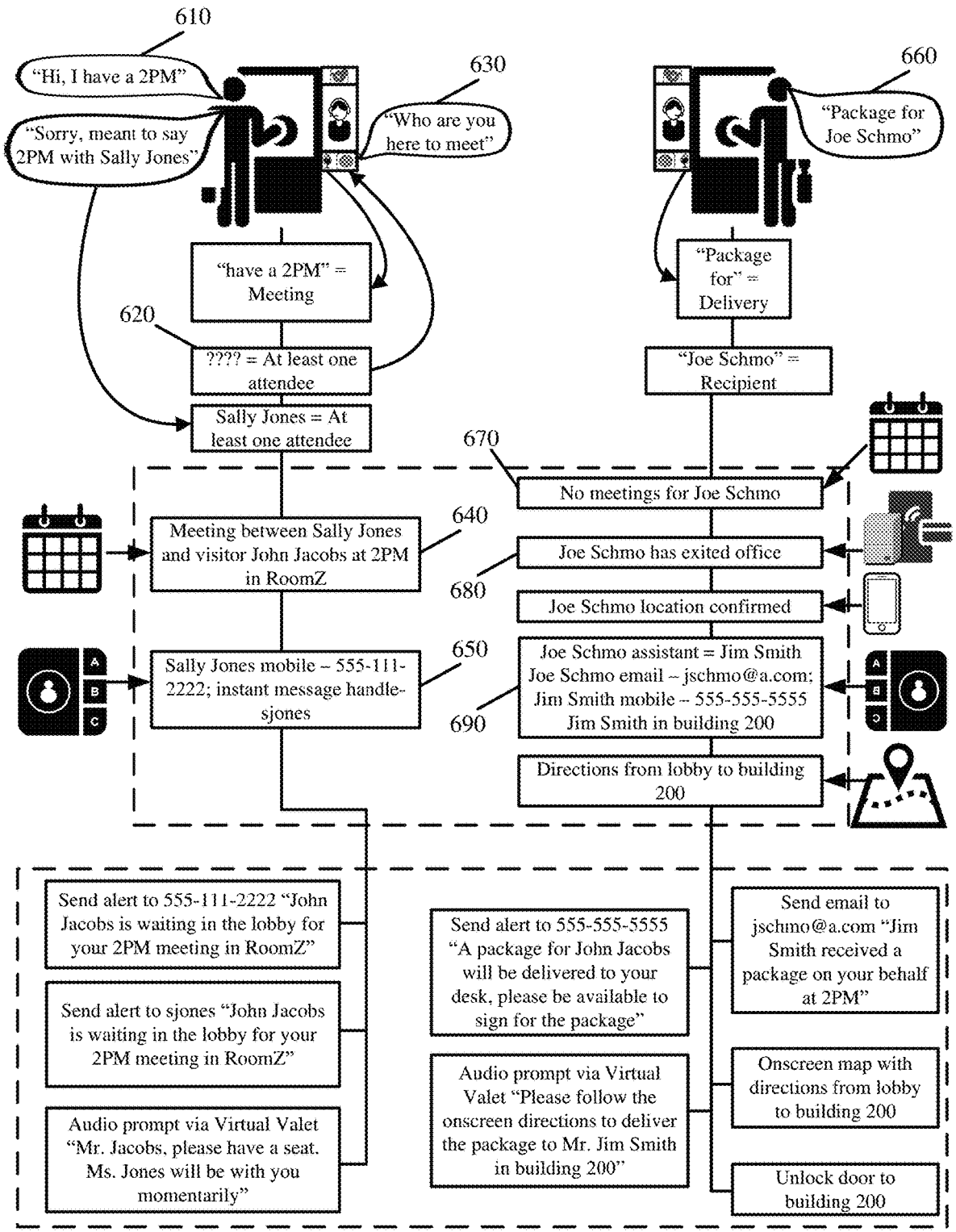
FIG. 6 provides different exemplary traversals of a rule set and system concierge generated actions and responses performed based on the traversals.

FIG. 6 provides different exemplary traversals of a rule set and system concierge generated actions and responses performed based on the traversals. In the first traversal, an audio prompt 610 spoken by a human is provided as an initial inquiry to a system valet. The audio 610 prompt states "Hi, I have a 2 PM". This is sufficient information for the system concierge to determine (at 620) the inquiry type (i.e., meeting). However, the audio prompt 610 contains insufficient information to complete the first inquiry data set for the identified inquiry type. Accordingly, the system concierge asks (at 630) the human through the system valet "Who are you here to meet?".

The subsequent prompt provided by the human and captured by the system valet satisfies the first inquiry data set and allows the system concierge to then build the second response data set for responding to the inquiry. In this first traversal, populating the second response data set involves the system concierge (i) querying a calendaring system to find the scheduled meeting (with Sally Jones at 2M) and (ii) querying a directory data source. From querying the calendaring system and finding the schedule meeting, the system concierge can populate (at 640) the second response data set with names of other attendees that may not have been named in the inquiry and the meeting room reserved for the meeting. The system concierge can then query the directory data source with the attendee names in order to obtain (at 650) contact information (e.g., mobile device telephone number, instant message handle, email, etc.) for the attendees. Other data elements that may be relevant for the second response data set for this example include querying an office map or navigational data source for directions to the meeting room.

The system concierge uses the contact information from the second response data set to notify the particular office personnel identified in the first inquiry data set via their communicably coupled mobile devices that a visitor has arrived for a meeting. Other actions include responding to the visitor through the system valet with an audio prompt that the other meeting participants have been contacted.

The second traversal illustrated in FIG. 6 is initiated based on an audio prompt 660 stating "Package for Joe Schmo". The system concierge receives the audio prompt and is able to determine the inquiry type as a delivery. The audio prompt 660 also contains sufficient information to populate the first inquiry data set for the delivery inquiry type.

In continuing with the second traversal, the system concierge populates the second response data set by querying a calendaring system, access control system, directory, and map or navigational data sources. Querying (at 670) the calendaring system reveals that the recipient of the package has no currently scheduled meetings and should therefore be available to receive the package. The system concierge then queries (at 680) the access control system to determine physical location of the recipient. The access control system can track office personnel that enter or leave different rooms or buildings based on different access permissions or credentials used by the office personnel for accessing and exiting different doors. In this figure, the access control system tracks the recipient as having left the building. The system concierge can supplement or confirm the recipient's location by tracking the location of the recipient's mobile device. If the mobile device is determined to be off-site (i.e., outside the building), the system concierge determines that the recipient is unavailable.

In response to the unavailability of the recipient, the system concierge queries (at 690) the directory to select a substitute recipient for the original unavailable recipient. Querying the directory also reveals contact information for the original recipient and substitute recipient. Although not shown, the rule set can again query the calendar system, access control system, or mobile device of the substitute recipient to confirm availability and location of the substitute recipient. In particular, the rule set can specify a "while" loop for selecting different substitute recipients until a suitable one is found meeting all the criteria. After finding the substitute recipient, the system concierge queries the map or navigational data source to obtain directions for guiding the delivery person in delivering the package to the substitute recipient.

The action performed by the system concierge based on the populated second response data set for the second traversal include notifying the original recipient that a package arrived and was received by the substitute recipient, notifying the substitute recipient to receive the package on behalf of the original recipient, providing an audio prompt with directions and an onscreen map through the system valet to guide the delivery person to the selected substitute recipient. The system concierge also accesses a control system in order to unlock a door along the path to the substitute recipient.

In some embodiments, the system concierge performs different subsets of actions defined in the rule set based on the data obtained for the second response data set. In some embodiments, the rule set defines chained actions in which the execution of one action commences after successful execution of one or more other actions. Such conditional action execution and serial action execution empowers the system concierge to generate complex responses to submitted inquiries.

Figure 7:
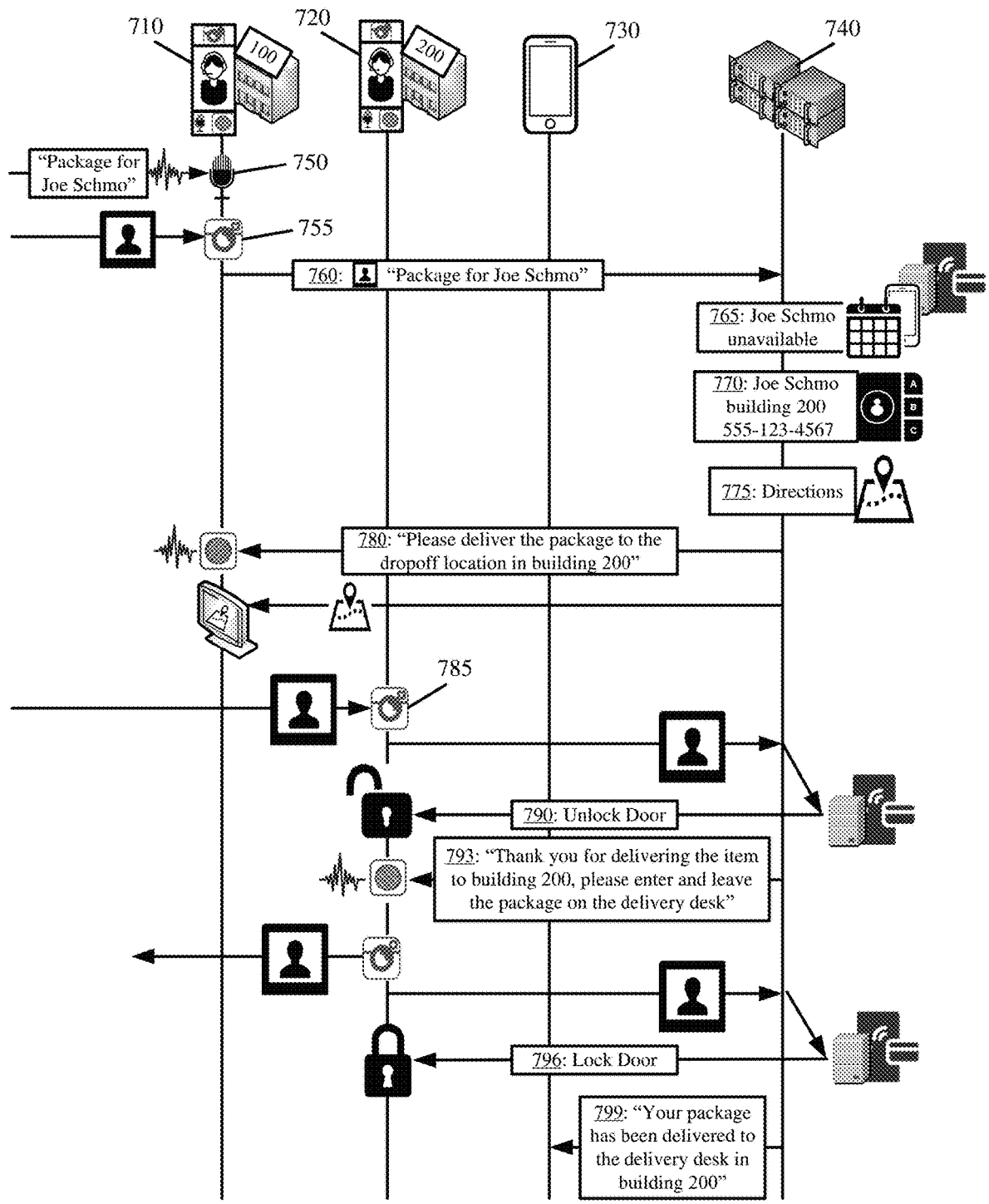
FIG. 7 illustrates the virtual office receptionist conditional and serial action execution in accordance with some embodiments.

FIG. 7 illustrates the virtual office receptionist conditional and serial action execution in accordance with some embodiments. The figure conceptually a first system valet 710 at a main lobby of building 100, a second system valet 720 at an access point to building 200, a mobile device 730 of a package recipient, and the system concierge 740 of some embodiments.

A delivery person approaches the first system valet 710 and provides an audio prompt stating "Package for Joe Schmo". The first system valet 710 captures (at 750) the audio prompt with its microphone and also captures (at 755) an image of the delivery person with its camera. The audio prompt and image are passed (at 760) from the first system valet 710 to the system concierge 740.

The system concierge 740 queries (at 765) one or more of a calendar data source, a mobile device of the recipient, and an access control system of the building to determine that the recipient, Joe Schmo, is unavailable to receive the package. Querying the calendar can show that the recipient is busy at the time of the delivery, while querying the mobile device or access control system can track the location of the recipient and determine that the recipient is offsite.

The system concierge 740 further queries (at 770) a directory data source to identify that the recipient works in building 200 and to obtain a contact number for the mobile device 730 of the recipient. In response to identifying the recipient working in building 200, the system concierge 740 queries (at 775) a map or navigational data source in order to obtain directions from the visitor's position (i.e., building 100 as determined from the first system valet 710 submitting the inquiry) to the position of the recipient in building 200 as determined from querying the directory data source.

The system concierge 740 responds to the inquiry by passing (at 780) a message to the first system valet 710. The message is played through the first system valet 710 speaker and instructs the delivery person to deliver the package to building 200.

The system concierge 740 then enters a first conditional path in the rule set. Actions specified under the first conditional path are executed by the system concierge 740 once the delivery person reaches the specified destination (i.e., building 200).

The second system valet 720 captures (at 785) an image of the delivery person upon his arrival at the locked access point of building 200. The second system valet 720 passes the captured image to the system concierge 740. The system concierge 740 verifies the arrival of the delivery person to the specified destination (i.e., building 200) by matching the image captured by the second system valet 720 with the image that was earlier captured by the first system valet 710.

In response to the verified arrival, the system concierge 740 executes the one or more actions defined under the first conditional path. These actions including issuing a command to the access control system to unlock (at 790) the door at building 200 and permit entry by the delivery person. The actions further include instructions (at 793) for the delivery person to deliver the package at a designated secure location within the building. The instructions are passed from the system concierge 740 to the second virtual valet 720. The second virtual valet 720 presents the instructions to the delivery person through its speaker upon detecting the delivery person's arrival at build 200.

The system concierge 740 then enters a second conditional path in the rule set. The actions specified under the second conditional path are executed by the system concierge 740 once the delivery person has successfully delivered the package.

The system concierge 740 determines successful delivery of the package in response to the delivery person exiting through the unlocked door and the second system valet 720 capturing an image of the delivery person leaving building 200 and passing that image to the system concierge 740. The system concierge 740 executes the actions of the second conditional path that include sending a command to the access control system for locking (at 796) the door and sending (at 799) an alert to the mobile device 730 using the contact number. The alert notifies the recipient that his package has been delivered to the secure location in building 200.

Other conditional paths can be invoked based on tracking movements of office personnel. In some such embodiments, the system concierge obtains contact information for mobile devices of implicated office personnel. The system concierge can then track the movements of the office personnel by tracking mobile device movements through Global Positioning System (GPS) or other wireless networks or beaconing. For instance, a visitor may arrive for a meeting with a particular employee. The system valet may tell the visitor to sit in a waiting room while the particular employee is contacted. The system concierge then contacts and monitors movements of the particular employee via the employee's mobile device. Once the particular employee is determined to be moving in the direction of the visitor, the system concierge can update the visitor with an expected arrival time of the particular employee through the system valet.

In some embodiments, the conditional paths of the rule set are established dynamically based on the original inquiry. In other words, the actual condition or actions performed in response to an inquiry change according to data that is parsed from the inquiry including implicated personnel, state of the implicated personnel, specified timing, or data that is accessed from one or more of the data sources.

Figure 8:
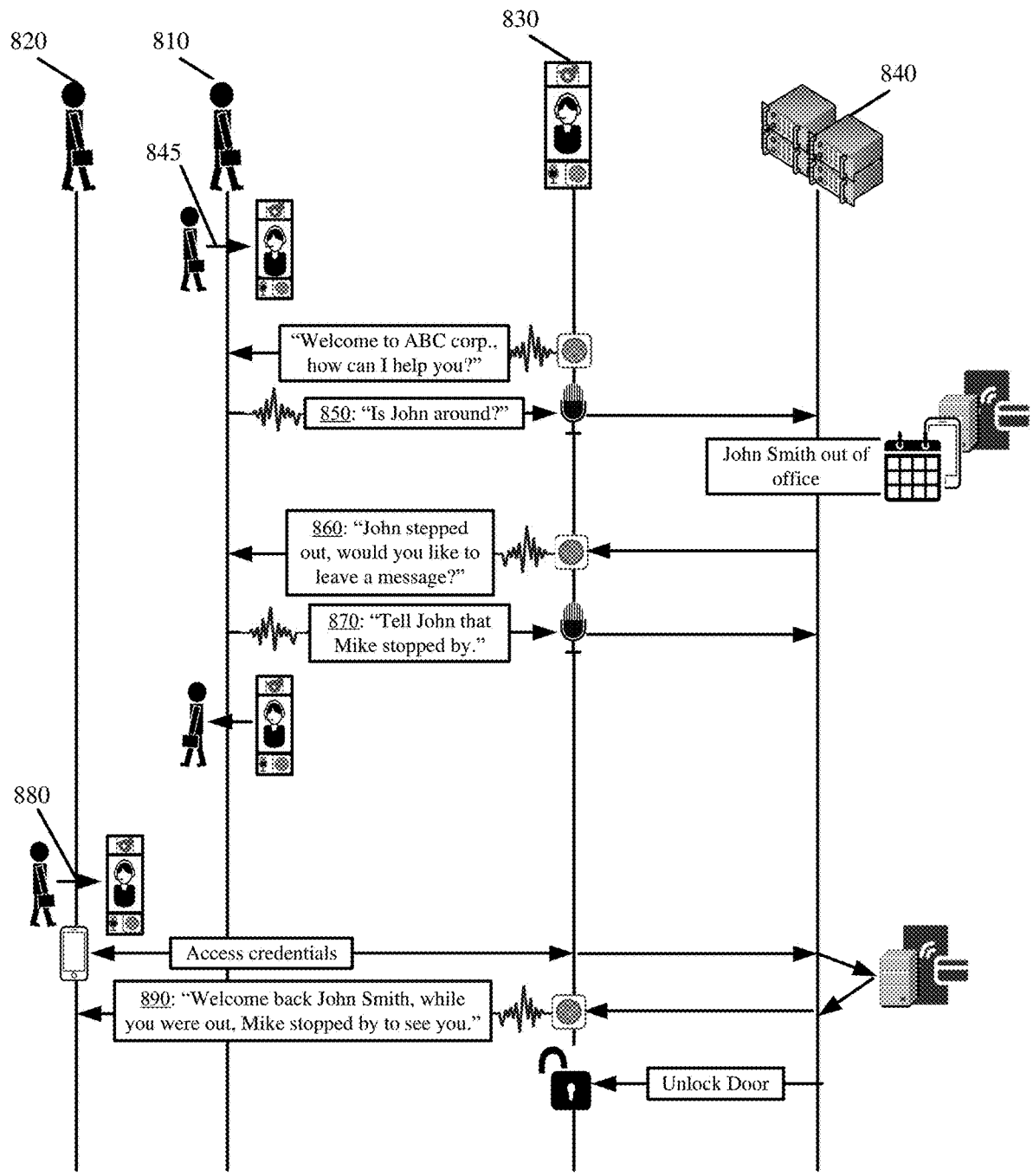
FIG. 8 illustrates the virtual office receptionist establishing and executing conditional actions based on an original inquiry in accordance with some embodiments.

FIG. 8 illustrates the virtual office receptionist establishing and executing conditional actions based on an original inquiry in accordance with some embodiments. The figure interactions of a first human 810 and a second human 820 with a system valet 830 and the system concierge 840 of some embodiments.

The first human 810 approaches (at 845) the system valet 830 and is greeted by the system valet 830. The first human 810 submits (at 850) an original inquiry in response to the greeting. The first human 810 asks to see the second human 820 who is an employee of the company. The inquiry passes to the system concierge 840.

The system concierge 840 determines that the second human 820 is currently unavailable, and more specifically, is out of the office based on information obtained from one or more of the calendar, mobile device, access control system, telephone system, or other communicably coupled and accessible data sources. The system concierge 840 response plays back through the system valet 830 and asks (at 860) whether the first human 810 would like to leave a message.

A dynamic condition is established based on the first human 810 response. In this figure, the first human 810 requests (at 870) that the second human 820 be notified of the first human's missed visit. The system valet 830 in conjunction with the system concierge 840 identifies the first human 810, whether through direct identification from an audio prompt provided by the first human 810 (e.g., "Tell John that Mike stopped by") or indirect identification from image matching, mobile device messaging, or other means. The system concierge 840 stores the message for conditional playback upon arrival of the second human 820. The system concierge 840 can also store a timestamp or image of the second human 820 in conjunction with the message. Other dynamic actions could involve the first human 810 declining and not leaving a message in which case the system takes no further action, or the system captures an image of the first human 810 for later presentation to the second human 820.

The second human 820 approaches (at 880) one of the system valets 830 at a later time. The second human 820 is identified at the system valet 830 by the system concierge 840. As noted above, the second human 820 can be identified based on credentials obtained from the second human's mobile device, credentials obtained from a keycard, capturing and matching an image of the second human to one in the directory data source, voice recognition, or other means. The identification of the second human 820 triggers traversal of the dynamic conditional branch established from the original inquiry of the first human 810. Consequentially, the system valet 830 plays (at 890) a customized greeting that alerts the second human 820 of the first human's 810 earlier visit—"Welcome back John Smith, while you were out, Mike stopped by to see you." Other assistive actions can include unlocking of the door to allow entry by the second human 820.

In some embodiments, the system concierge verifies the first inquiry data set before performing any of the actions specified for the inquiry type. The verification can be performed against the second response data set or as a result of building the second response data. The system concierge performs the verification to prevent misuse of the system. The verification prevents an uninvited solicitor from requesting a meeting with the executives of a company. The verification also prevents unauthorized humans from gaining access to different access points or resources. For example, the system concierge may receive a complete first inquiry data set formed from an inquiry stating that "John Doe is here to see Michael Smith". In forming the second response data set, the system concierge inspects the calendar of Michael Smith to verify whether John Doe has a scheduled meeting at or near the time of the inquiry. If no such meeting with John Doe is found, the system concierge performs one or more verification actions. The verification actions can include stating that "Mr. Smith is not available, would you like to leave a message for him?", contacting Mr. Smith discreetly to confirm directly whether he is expecting a meeting with John Doe, or connecting the visitor to another employee that can assist in clarifying the matter.

In some embodiments, the system concierge further verifies that the actions are successfully performed. By having access to mobile devices of office personnel, the system concierge can track office personnel movements to determine whether or not they attend meetings in specific conference rooms. If an individual is delayed as a result of forgetting, being tied up in another meeting, or for other reasons, the system concierge can submit reminders until verifying the individual has moved to the correct location or the individual cancels the action.

The virtual office receptionist strives to achieve human-to-human interactivity. The first step of this interactivity is to greet humans at the system valets as the humans arrive so that they become aware that inquiries and other interactions are to first take place with the system valet.

As noted above, the system valets include several different sensors with which to recognize the presence of a human and trigger the greeting. Detecting sound of human movements or voices via the microphone can be one trigger. Detecting motion through a camera, motion sensor, light sensor, or other sensor can be another trigger. Communicably coupling with a mobile device on a person of a nearby human with short-range wireless connectivity is yet another trigger. Any such triggers are sufficient to provide a general greeting through the system valet, such as "Hello and welcome to XYZ corporation, how may I assist you today?".

The system valet may selectively activate sensors for detecting human presence and triggering a greeting due to power considerations. For example, the system valet may initially activate only a motion sensor. Once motion from a human is detected by the motion sensor, the system valet may then activate its camera and microphone. Alternatively, the system valet may activate all sensors with which it can detect human presence including a camera and short-range wireless connectivity, but deactivate other sensors that are not suited for detecting human presence such as the microphone.

Some embodiments improve the interactivity by customizing the greeting provided by the system valet. The audible greeting can be customized for a human all before the human issues any kind of inquiry to the system valet. In some embodiments, the greeting is customized based on images captured by the system valet camera, network connections established between the system valet and a mobile device carried by the human, and audio captured by the system valet microphone.

Beyond customized greetings, the ability to recognize humans approaching the system valet using one or more sensors of the system valet and one or more data sources at the system concierge empower the virtual office receptionist system to operate in a secretarial capacity. More specifically, the system concierge can supplement the customized greeting with information that is relevant to the identified human. The system concierge extracts the relevant information for the recognized or identified human from the different data sources that are communicably coupled to the system concierge. The relevant information supplementing the customized greeting for the identified human can include reminders about upcoming meetings the identified human has, important emails or other messages received by the identified human, missed calls, awaiting messages, packages for the identified human that have been delivered, as well as status on other employees (e.g., subordinates, partners, etc.). A specific example of a customized greeting that is supplemented with relevant information was provided above with reference to FIG. 8.

The system concierge can also perform various automated assistive functions in response to recognizing or identifying humans. In some embodiments, the system concierge unlocks an access point for a human that is identified to have access rights to that access point when the human approaches a system valet adjacent to the access point. In some such embodiments, the system concierge is communicably coupled to an access control system, electronic lock, or other control system of the building controlling the locking and unlocking of the access point. The system concierge can connect to a building lighting system to turn lighting on and off, climate control systems to adjust room temperature automatically, and other systems controlling other resources based on identified approaching humans.

When communicably coupled with an access control system, the system concierge and system valets can also serve as an extension of that access control system. The system concierge can request identifying information about a human before a virtual valet that is adjacent to a restricted door controlled by the access control system. The system concierge generates a one-time access entry prompt for the identified human based on information the system concierge obtains from one or more of the communicably coupled data sources. The one-time access entry prompt is a question derived from the pool of information the system concierge is able to obtain about the identified human from the data sources. Since the question is particular to the identified human, the identified human should have the answer while others attempting to impersonate the identified human will be unable to correctly answer the question. The one-time access entry prompt is played through the system valet and if the human responds with a correct answer to the prompt, the system concierge initiates unlocking of the restricted door. The system concierge sends an unlock command to an electronic lock locking the restricted door or to the access control system controlling the restricted door. A different one-time access entry prompt can be generated the next time the same human seeks access to a restricted door so that even if the answer to the initial question is overheard by another person, the answer will be unusable in opening access.

Even when the human cannot be identified because the human is an unrecognized visitor, the system concierge can nevertheless produce a customized greeting for differentiating between visitors (e.g., unrecognized humans) and office personnel (e.g., humans that match to images in the directory data source). A first greeting for visitors may state "Welcome to ABC corp. How can I assist you?" and a second greeting for recognized office personnel may state "Welcome back [name]".

Figure 9:
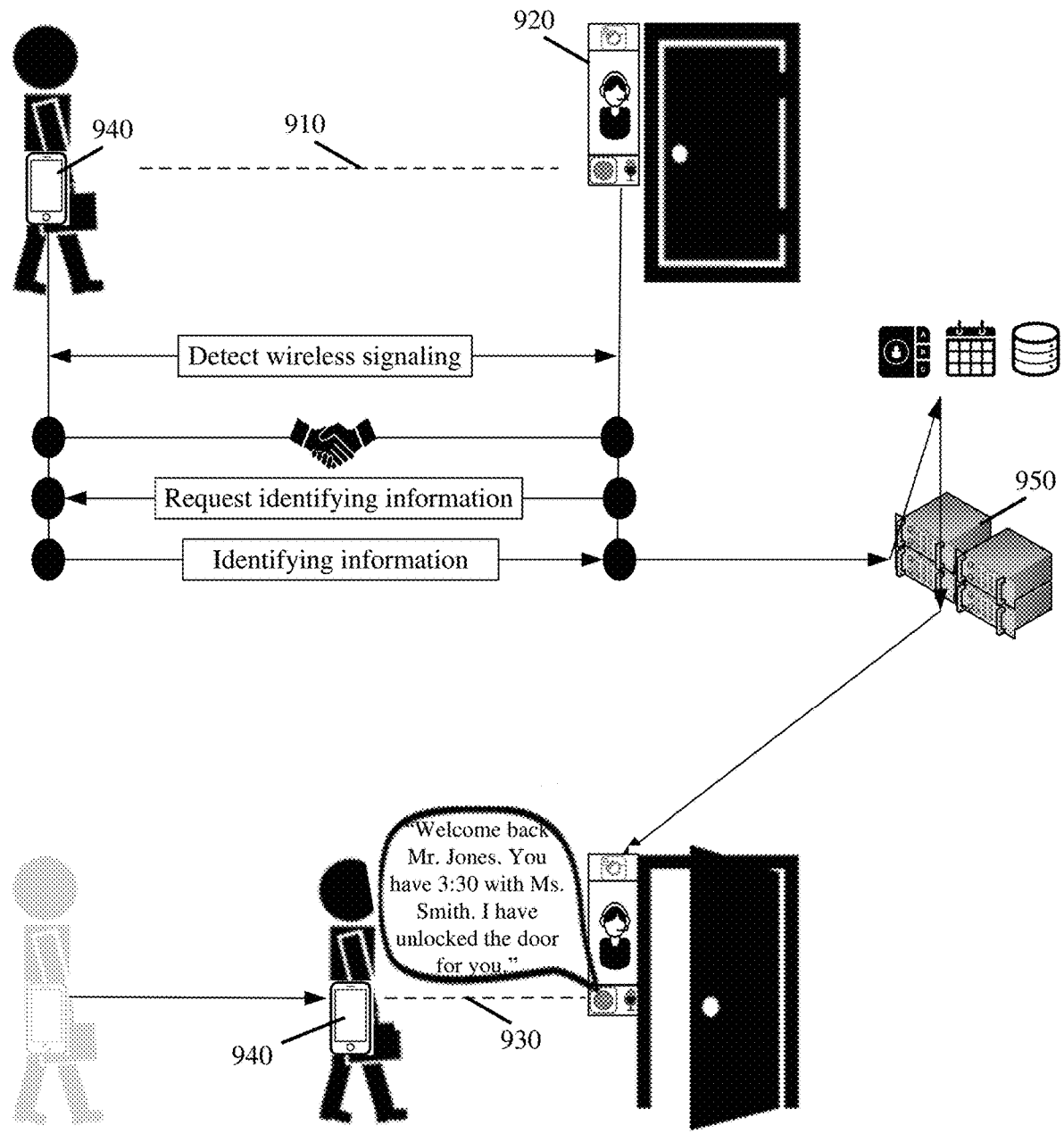
FIG. 9 illustrates generating customized greetings in accordance with some embodiments.

FIG. 9 illustrates generating customized greetings in accordance with some embodiments. The figure illustrates a human a first distance 910 from a system valet 920, and then a second distance 930 from the system valet 920.

At the first distance 910, a mobile device 940 carried by the human comes within wireless range of the system valet 920. This allows either the system valet 920 to detect wireless signaling from the mobile device 940, or the mobile device 940 to detect wireless signaling from the system valet 920. The wireless signaling may be detected over Bluetooth, Bluetooth Low Energy, Near Field Communications, WiFi, or other short-range wireless network connectivity. Either device may disseminate an identifier or perform a network or device discovery procedure to detect the other. The first distance 910 separating the mobile device 940 and the system valet 920 may prevent the human from interacting with the system valet 920, but is sufficient for the system valet 920 to communicate with the mobile device 940 carried by the human.

The mobile device 940 and system valet 920 establish a connection with one another in response to detecting one another. In some embodiments, establishing a connection involves performing a network protocol handshake and encrypting communications over the connection. It should be noted that the connection can be established very quickly while the human remains too far to communicate with the system valet 920.

The system valet 920 communicates directly with the mobile device 940 over the established connection without involvement by the human. The system valet 920 requests identifying information from the mobile device 940. The identifying information is any information that the virtual office receptionist can use to determine identity of the human. The identifying information can be one or more of a telephone number, International Mobile Equipment Identity (IMEI), email address, authentication token, name, access credential, or identifier. The identifying information can also be obtained as a result of the mobile device 940 performing a registration or authentication procedure with the system valet 920 upon or as part of establishing the connection. The system valet 920 receives the identifying information and, with assistance from the system concierge 950, performs a mapping operation to determine the human identity based on querying the data sources with the identifying information. In some embodiments, the mapping operation involves querying a directory data source with the identifying information to determine if the human is an employee listed within the directory. If the identifying information is successfully matched to an identity, the system concierge 950 customizes the greeting that the system valet 920 presents to the human based on the identified identity.

The system valet 920 presents the customized greeting when the human comes closer and is at the second shorter distance 930 from the system valet 920. The distance of the human from the system valet 920 can be determined from the camera or other sensor of the system valet 920. The distance can alternatively be determined based on the wireless signaling or signal strength from the mobile device 940. The customized greeting is therefore generated without any action by the human and is presented before the human takes any action, similar to how a human receptionist greets recognized individuals.

As noted above, the customized greeting can supplement the customized greeting with information that the system concierge 950 extracts for the identified human from the calendar, email, directory, telecommunication, and other data sources communicably coupled to the system concierge 950.

In some embodiments, one or more automated assistive functions are performed in connection with presentation of the customized greeting. In this figure, the system concierge 950 determines that the identified human has access privileges to a door adjacent to the system valet during the identity mapping operation. Once the human is at the second distance 930 from the system valet 920, the customized greeting is presented and the door is automatically unlocked to allow the human entry without any action on the part of the human.

In some embodiments, the system concierge performs the human identification based on one or more images of the human the system valet captures when the human is at the first distance. In some such embodiments, the system concierge identifies the human's identity by matching the captured images from the system valet against images in a directory data source or images from the Internet.

The system concierge can also customize responses after an initial inquiry from a visitor. The system concierge may not recognize the visitor from images or messages exchanged with the visitor's mobile device. However, the visitor inquiry may state "I am here to see Mr. Jones for a 2 PM meeting". The system concierge can then access the calendar or emails of Mr. Jones and determine the visitor's name as an attendee of the 2 PM meeting. The system concierge can then customize responses based on the unrecognized visitor's name in the calendar or email system.

The virtual office receptionist of some embodiments can also fulfill secretarial functions with little to no modification to the hardware or operation. In particular, system valets can be located in employee offices or on employee desks or cubicles. Moreover, employee mobile devices include at least the base set of hardware for the system valets including a power source, processor, microphone, speaker, and network connectivity. Accordingly, some embodiments place system valet functionality, especially, the secretarial functions, as an application running on the mobile phones of employees. In some such embodiments, employees can access the virtual office receptionist functionality, and specifically the secretarial functions described below, wherever they are.

The secretarial functions available to employees include instant access to information from the directory data source (for names, roles, contact information, locations, etc. of other employees), simplified email and calendar access (for reminders, scheduling, and sending), telephone system access (for missed calls, voicemails, and simplified conferencing), and other data source access. For instance, an employee can issue a command such as "Set a meeting at 2 PM on June 1 with Joe Schmo in conference room X". The system valet (whether as a physical desktop device or an application running on the employee mobile phone) passes the audio prompt to the system concierge. The system concierge can parse the audio prompt, verify that the meeting room is available, send out the invite to Joe Schmo, and place an appointment in the calendar of the requestor at the appointed time.

The embodiments above disclose a virtual office receptionist system architecture in which the system valets are physically separate devices from the system concierge. Separating the functionality of these devices is cost effective for large scale deployments in which several system valets rely on a back-end system concierge for the rule set traversals, action execution, and response generation. This separated architecture reduces the cost of each system valet as the system concierge hardware and logic remains separate from the system valets. In other words, the system valets can be manufactured with fewer components and with more rudimentary logic.

The separated architecture may however increase costs for smaller deployments in which there is one or a few system valets operating with a system concierge. For some such deployments, some embodiments provide a combined system architecture.

The combined system architecture integrates all hardware and logic of the system concierge directly into the system valet. In some such embodiments, this includes configuring the system valet with a more powerful processor and larger memory. The system valet directly communicably couples to the different data sources using its network connectivity. The system valet stores the rule sets in memory so that rule set traversals, action execution, and response generation is performed locally on the system valet with the processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An office receptionist system comprising:
a plurality of system valets distributed about different points of egress and ingress of a company with at least one of the plurality of system valets comprising a microphone, network connectivity, and a speaker;
a system concierge comprising a processor and network connectivity, the network connectivity communicably coupling the system concierge to each system valet of the plurality of system valets and to a plurality of data sources of said company, wherein the processor:
parses a first set of data elements from an audio inquiry that is captured by a first system valet, wherein the first set of data elements comprises at least one of a subject, time, location, person, or object;
selects a meeting inquiry type from a plurality of different inquiry types based on the first set of data elements, that are parsed from the audio inquiry, having entries for a subset of a particular set of data elements of the meeting inquiry type, wherein each inquiry type of the plurality of inquiry types specifies a different set of data elements for a different inquiry, wherein each inquiry type of the plurality of inquiry types is linked to different subsets of the plurality of data sources, and wherein the plurality of different inquiry types comprise two or more of a meeting, delivery, message, request for direction, or access to a resource;
generates a first prompt for playback via the first system valet in response to the first set of data elements, that are parsed from the audio inquiry, omitting entries for one or more of the particular set of data elements of the meeting inquiry type, wherein generating the first prompt comprises customizing the first prompt based on the one or more data elements from the particular set of data elements that are omitted from the first set of data elements;
passes at least the first prompt to the first system valet until a second set of data elements, that are parsed from audio replies provided by a human at the first system valet, and the first set of data elements include an entry for each data element of the particular set of data elements for the meeting inquiry type;
determines an identity of the human as an expected visitor to a particular scheduled meeting in response to matching a data element from either the first set of data elements or the second set of data elements to one of different visitor names from the particular scheduled meeting;
generates a first machine generated reply for playback by the first system valet, the first machine generated reply comprising a customized greeting that identifies the expected visitor using a name from the data element that matches to one of the visitor names from the particular scheduled meeting and that provides instruction for traversing a path to a desired location; and
directs the human to the desired location by opening access to one or more of the points of egress and ingress in response to matching input from a first set of the plurality of valets along the path to input that identifies the human and that is obtained from the first system valet, and by providing a second machine generated reply for playback by a second system valet that is located adjacent to the location in response to matching input from the second system valet to the input that identifies the human and that is obtained from the first system valet.

2. The office receptionist system of claim 1, wherein the system concierge further comprises an audio processing unit, said audio processing unit performing said matching of the data element to one of the visitor names.

3. The office receptionist system of claim 1, wherein the at least one system valet further comprises a camera, said camera capturing an image of the human, the at least one system valet passing said image with the audio inquiry to the system concierge using the network connectivity.

4. The office receptionist system of claim 3, wherein the system concierge further comprises an image processing unit, said image processing unit matching the human in said image captured by the camera to a visitor image that is obtained as a result of querying a data source of the plurality of data sources or an external data source based on the visitor names, wherein the second data source is one of (i) an employee directory storing images of a plurality of company employees and (ii) a calendaring system storing an Internet downloaded image of the known visitor.

5. The office receptionist system of claim 1, wherein the network connectivity of the at least one system valet comprises a wireless networking module, said wireless networking module receiving identity information about the human from a mobile device on a person of the human in response to establishing a connection with the mobile device and exchanging at least one wireless message.

6. The office receptionist system of claim 1, wherein one of the plurality of data sources comprises a mobile device carried by a company employee that is implicated by said audio inquiry, the system concierge tracking movements of the company employee using said mobile device, and wherein generating the machine generated reply comprises notifying the human about arrival of the company employee in response to tracking movements of the company employee in the direction of the human.

7. A method comprising:
differentiating a visitor from a plurality of recognized users based on at least one sensor of a system valet placed adjacent to a point of ingress or egress detecting arrival of a first human, and the system valet being unable to exchange specific messaging with a mobile device of the first human, wherein the at least one sensor comprises one or more of a camera, microphone, touch sensor, motion sensor, light sensor, or heat sensor;
providing a customized first greeting for the visitor in response to detecting the first human and not being able to exchange the specific messaging with the mobile device of the first human;
capturing an audio response, that is provided by the first human, with the at least one sensor of the system valet;
matching audio from a segment of the audio response to a particular name of a particular recognized user from the plurality of recognized users listed in a remote data source based on phonetic similarity between said segment and said particular name;
storing, for the particular recognized user, the audio response as a message in response to verifying that a scheduled meeting between the particular recognized user and the first human does not exist;
detecting, by the system valet, arrival of a different second human before the system valet using the at least one sensor;
identifying the second human as the particular recognized user based on successfully exchanging the specific messaging between the system valet and a mobile device of the particular recognized user;
providing, by the system valet, a different customized second greeting for the particular recognized user that includes the message in response to said detecting and said identifying; and
unlocking access to the point of ingress or egress in response to said detecting and said identifying.

8. The method of claim 7 further comprising obtaining contact information for the mobile device of the particular recognized user from the remote data source.

9. The method of claim 8 further comprising alerting the particular recognized user as to arrival of the visitor by passing the message to the mobile device of the particular recognized user using said contact information.

10. The method of claim 9 further comprising identifying the first human as the visitor in said alerting, wherein said identifying the first human comprises retrieving a plurality of visitor names from a plurality of meetings entered to the remote data source, and matching a different second segment of the audio response to a name of the first human in the plurality of visitor names.

11. The method of claim 7 further comprising sending an alert to the mobile device of the particular recognized user in response to verifying that a scheduled meeting between the particular recognized user and the first human exists at a time of the audio response, the alert indicating arrival of the first human as an attendee to the scheduled meeting.

12. A method comprising:
detecting presence of a first user with at least one sensor of a device placed adjacent to a point of ingress or egress, wherein the at least one sensor comprises one or more of a camera, microphone, touch sensor, motion sensor, light sensor, or heat sensor;
capturing an inquiry from the first user using the at least one sensor of said device;
parsing a first set of data elements from the inquiry;
selecting a particular inquiry type from a plurality of different inquiry types based on the first set of data elements, that are parsed from the inquiry, having entries for a subset of a particular set of data elements of the meeting inquiry type, wherein each inquiry type of the plurality of inquiry types specifies a different set of data elements for a different inquiry, wherein each inquiry type of the plurality of inquiry types is linked to different systems of a company, and wherein the plurality of different inquiry types comprise two or more of a meeting, delivery, message, request for direction, or access to a resource;

prompting the first user with a first message directed to one or more data elements from the particular set of data elements in response to the first set of data elements, that are parsed from the inquiry, omitting entries for the one or more data elements, wherein said prompting comprises customizing the first request based on the one or more data elements from the particular set of data elements that are omitted from the first set of data elements;

passing at least the first message to the device until a second set of data elements, that are parsed from input provided by the first user, and the first set of data elements include an entry for each data element of the particular set of data elements for the particular inquiry type;

determining that the first user and a different second user are participants in a meeting scheduled at a meeting location in response to matching a data element from either the first set of data elements or the second set of data elements to a participant name listed for the meeting;

creating a machine generated reply for the first user at the device, wherein said creating comprises:
  (i) generating a second message that is played back to the first user at the point of ingress or egress via said device in response to tracking movement of the second user towards the first user or the meeting location, and
  (ii) generating a different third message that is played back to the first user at the point of ingress or egress via said device in response to tracking no movement of the second user or the second user moving away from the first user or the meeting location; and outputting said machine generated reply from said device.

13. The method of claim 12, wherein said parsing comprises extracting data elements for the first set of data elements from the inquiry based on matching an audio segment from the inquiry to a particular name in an electronic directory, an email system, or the calendar system with phonetic similarity to the audio segment.

14. The method of claim 12, wherein creating the machine generated reply further comprises (iii) obtaining contact information for a mobile device of the second user, and (iv) sending an alert about arrival of the first user to the mobile device.

15. The method of claim 12, wherein creating the machine generated reply further comprises (iii) determining that the second user is unavailable, (iv) selecting a third user not implicated by the inquiry as a replacement for the second user based on accessing an electronic directory identifying the third user having a role related to the second user, and (v) alerting the third user about the inquiry.

16. The method of claim 12 further comprising tracking a location of the second user based on entering and exiting logs of an access control system of the company.

* * * * *